(12) United States Patent  (10) Patent No.: US 9,056,562 B2
Naughton  (45) Date of Patent: Jun. 16, 2015

(54) ACTUATOR DEVICE FOR THE SEAT ADJUSTMENT IN A MOTOR VEHICLE

(75) Inventor: Michael Naughton, Stolzenau (DE)

(73) Assignee: Faurecia Autositze GmbH (DE)

( * ) Notice: Subject to any disclaimer, the term of this patent is extended or adjusted under 35 U.S.C. 154(b) by 575 days.

(21) Appl. No.: 13/098,828

(22) Filed: May 2, 2011

(65) Prior Publication Data

US 2012/0104825 A1    May 3, 2012

(30) Foreign Application Priority Data

May 3, 2010   (DE) .................. 10 2010 019 029

(51) Int. Cl.
*B60N 2/02* (2006.01)
*F16F 1/14* (2006.01)
*B60N 2/20* (2006.01)
*B60N 2/22* (2006.01)

(52) U.S. Cl.
CPC .. *B60N 2/20* (2013.01); *B60N 2/22* (2013.01); *B60N 2205/50* (2013.01)

(58) Field of Classification Search
CPC ........ B60N 2/20; B60N 2/22; B60N 2205/50; B60N 2/2252
USPC ...... 74/553, 526, 527; 297/362, 367 P, 367 R
See application file for complete search history.

(56) References Cited

U.S. PATENT DOCUMENTS

| 4,089,496 | A | * | 5/1978 | Mizusawa ........................ 248/56 |
| 4,883,319 | A | * | 11/1989 | Scott ........................... 297/354.1 |
| 5,634,689 | A | * | 6/1997 | Putsch et al. ................... 297/362 |
| 6,955,251 | B2 | * | 10/2005 | Kurita et al. ..................... 192/19 |
| 7,314,250 | B1 | * | 1/2008 | Eblenkamp et al. ........... 297/362 |
| 8,079,287 | B2 | * | 12/2011 | Castillo ........................... 74/553 |
| 8,251,451 | B2 | * | 8/2012 | Dziedzic .................... 297/367 P |
| 8,556,340 | B2 | * | 10/2013 | D'Agostini .............. 297/216.14 |
| 8,678,155 | B2 | * | 3/2014 | Kawai et al. ............. 192/45.017 |

FOREIGN PATENT DOCUMENTS

| DE | 7521224 | | 10/1975 | |
| DE | 4436101 | | 6/1995 | |
| EP | 0098400 | | 1/1984 | |
| FR | 2926644 | | 7/2009 | |
| GB | 1 531 634 | * | 11/1978 | ............... F16D 1/06 |
| JP | 8-95657 | * | 4/1996 | ............... G05G 1/12 |

OTHER PUBLICATIONS

English Abstract of JP 8-95657, Watanabe, Apr. 12, 1996.*

* cited by examiner

*Primary Examiner* — Vinh Luong

(57) ABSTRACT

An actuator device for the seat adjustment in a motor vehicle, exhibiting at least one ratchet fitting (1), a transmission element (2) and an actuator element (3), whereby the transmission element (2) is centered in the ratchet fitting (1) with a centering element (4) such that the centering element (4) allows for a limited torsional backlash between the transmission element (2) and the ratchet fitting (1) and creates a restoring force against the rotation, whereby said transmission element (2) is connected in a torsionally stiff manner to the actuator element (3), whereby the actuator element (3) is connected in a form-fitting manner to the centering element (4).

9 Claims, 5 Drawing Sheets

ACTUATOR DEVICE FOR THE SEAT ADJUSTMENT IN A MOTOR VEHICLE

CROSS-REFERENCE TO RELATED APPLICATIONS

This application claims priority from German Patent Application 10 2010 019 029.2-14 titled "Actuator Device for the Seat Adjustment in a Motor Vehicle", which was filed on May 3, 2010 and incorporated fully herein by reference.

TECHNICAL FIELD

The invention relates to an actuator device for the seat adjustment in a motor vehicle as well as to a centering element.

BACKGROUND INFORMATION

With motor vehicle seat adjustments, it is currently common to use ratchet fittings that can be unlocked by the user via an actuator element, for example a lever, and in the unlocked condition allow for pivoting an element of the vehicle seat, in particular the backrest of the vehicle seat. Often, these ratchet fittings are provided on both sides of the vehicle seat. In such cases, the unlocking mechanism must be designed in such a way as to allow for the simultaneous unlocking of both ratchet fittings.

The required mechanical coupling of the two ratchet fittings with the actuator element necessary for this brings with it the problem of the relative position tolerances of the two ratchet fittings towards each other. Attaching an actuator element on one single fitting can for example be accomplished with simple clip connectors as is disclosed in DE-GM 75 21 224. However, if for example two fittings are to be coupled, as is shown in EP 0 098 400 B1, then both fittings must be coupled using a transmission element, which, for one, requires increased demands on the position tolerances of the fittings in relation to each other, and secondly entails a more complex assembly of the actuator device. For this reason, FR 2926644 A1 provides an interim element between the axis and the actuator element that is used to support the actuator element on the transmission element in a tortionally rigid but axially movable fashion and attach it to the fitting in a rotating but in the axial direction of the transmission element fixed manner.

SUMMARY

It is the underlying objective of the invention to present an actuator device for a seat adjustment in a motor vehicle that allows, first, high production tolerances and, second, enables a simple and thus cost-effective assembly.

This objective is achieved through an actuator device for a seat adjustment in a motor vehicle as well as through a centering element. The invention features an actuator device for the seat adjustment in a motor vehicle, exhibiting at least one ratchet fitting, a transmission element and an actuator element, whereby the transmission element is centered in the ratchet fitting with a centering element such that the centering element allows for a limited torsional backlash between the transmission element and the ratchet fitting and creates a restoring force against the rotation, whereby said transmission element is connected in a torsionally stiff manner to the actuator element, whereby the actuator element is connected in a form-fitting manner to the centering element.

According to the invention, at least one ratchet fitting is provided that is actuated by a transmission element. The transmission element is a shaft or rod or a similar torsionally stiff component that is connected in a torsionally stiff manner to the actuator element, which may be a release lever, for example. Essential for the invention is that the connection of the transmission element to the ratchet fitting is made through an inventive centering element. The centering element centers the transmission element in the ratchet fitting and due to its design allows for a limited torsional backlash between the transmission element and the ratchet fitting. However, by its design it generates a restoring force against the rotation as long as the rotation is within the range of the allowed torsional backlash. The actuator element that is torsionally stiff connected to the transmission element is at the same time connected to the centering element in a form-fitting manner.

The actuator element is held in a defined position in relation to the ratchet fitting by the form-fitting connection with the centering element. However, the actuating impulse, which is a rotational movement around the axis of the transmission element, is not transferred directly from the actuator element to the centering element, rather initially from the actuator element to the transmission element. The transmission of the actuating impulse from the transmission element to the ratchet fitting then occurs via the centering element, which allows the described torsional backlash with an elastic restoring force between the ratchet fitting and the transmission element. The torsional backlash serves the purpose of compensating for manufacturing and installation tolerances. These tolerances play a role in particular when ratchet fittings are attached to both sides of the seat and shall be actuated using the same actuator element, i.e., by using the same transmission element, which advantageously connects the two ratchet fittings.

Advantageously, the connection between the actuator element and the transmission element is designed such that while torsionally stiff it remains axially moveable to compensate for axial position tolerances between the actuator element and the transmission element, whereby advantageously the axial distance of the actuator element is determined merely by the form-fitting connection with the centering element. Advantageously, this form-fitting connection of actuator element and centering element is not designed in a torsionally stiff manner, which can be achieved, for example, in that the actuator element is connected to the centering element by form-fitting elements, which encompass a form-fitting counter element at the centering element. The form-fitting counter element can be a ring-shaped collar on the centering element. Advantageously, the form-fitting elements are arranged at equal distances to the axis of the transmission element such they are able to encompass the ring-shaped collar and to move thereon in the circumferential direction. Advantageously, the form-fitting elements are arranged distributed along the circumference of a circle around the axis of the transmission element and are designed such that the form-fitting connection can be established simply by attaching the actuator element onto the centering element.

With such a connection the installation of the seat is made much easier, as the transmission element that is connected, for example, with a second ratchet fitting or a further transmission element leading to the same, which, for example, can be done by a welding process, can be guided loosely through the first ratchet fitting, and can be centered and easily secured in the latter simply by sliding on the centering element, after which an assembly of the actuator element is also possible in a simple manner by a further push-on procedure. Advantageously, here the centering element is designed such that it exhibits an essentially hollow cylinder-like base section. In the area of its internal surface, the base section shaped like a hollow cylinder exhibits a contour that is suited for the form-fitting engagement at a counter-contour to be provided at the transmission element. The contours are designed such that they allow for one, due to their dimensions in relation to the counter contour, a limited torsional backlash, and second present a form-fit that is axially moveable to allow the transmission element to be pushed on and to compensate for the axial tolerances. Preferably, contouring involves at least one groove extending essentially in an axial direction and allowing the torsional backlash based on its width selected in the circumferential direction.

To secure its axial position relative to the ratchet fitting, the centering element preferably exhibits stop surfaces, which when pushing the centering element onto the transmission element strike in the end position of the centering element at the ratchet fitting in the axial direction.

The section of the centering element that points away from the seat in this end position is designed such that it features a form-fitting counter element, which can be a neck collar, for example. This form-fitting counter element is preferably located in the area of the end of the centering element that points in the axial direction away from the seat.

Also provided at the centering element are spring elements, which are suited to launch a spring force in the circumferential direction into a counter contour to be provided at the transmission element. Advantageously, the spring elements can be finger-like protrusions that following the main body in the axial direction and in the assembled state rest against the counter contour of the transmission element in the direction of the circumference.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
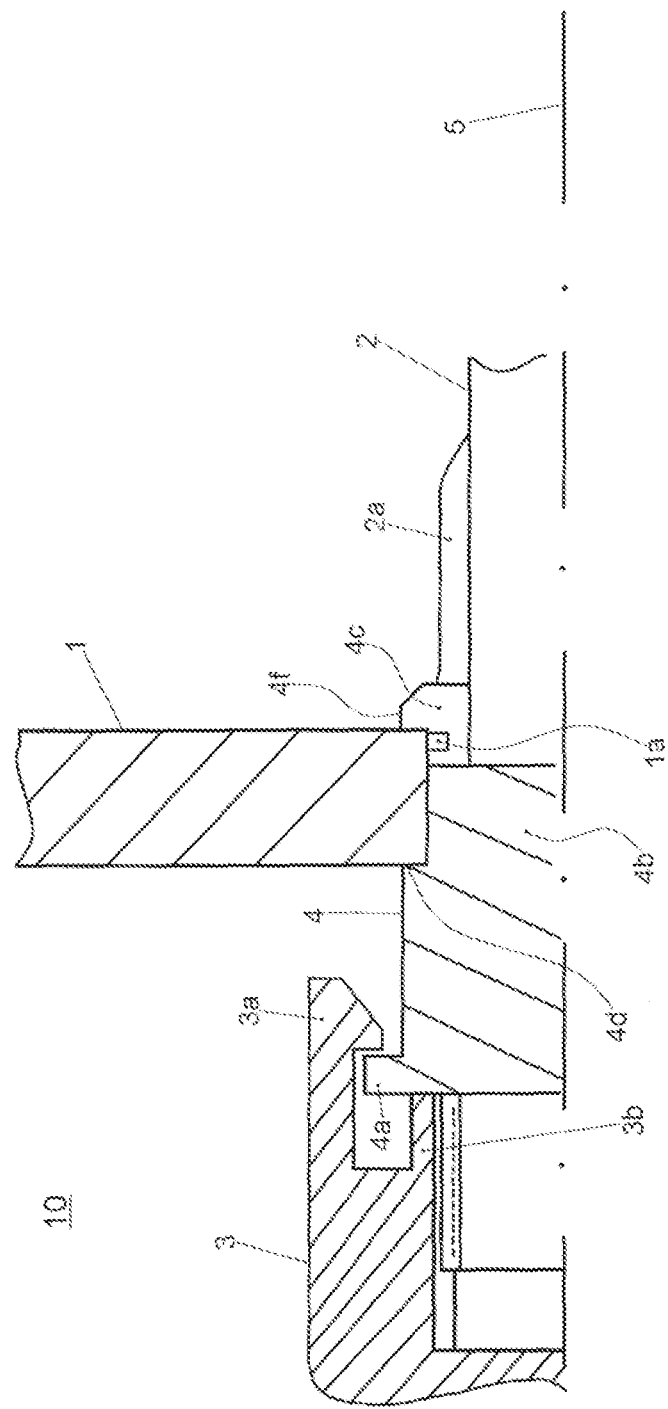
FIG. 1 is a schematic drawing showing an exemplary presentation of a longitudinal section of the actuator device according to the invention.
Figure 2:
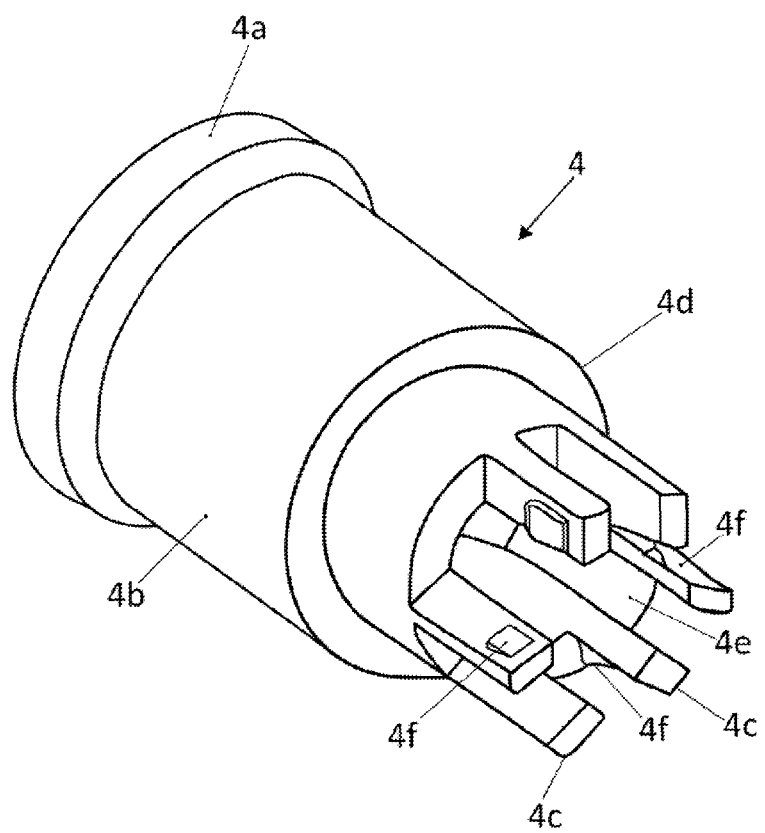
FIG. 2 is a schematic drawing showing an example of the centering element according to the invention.
Figure 3:
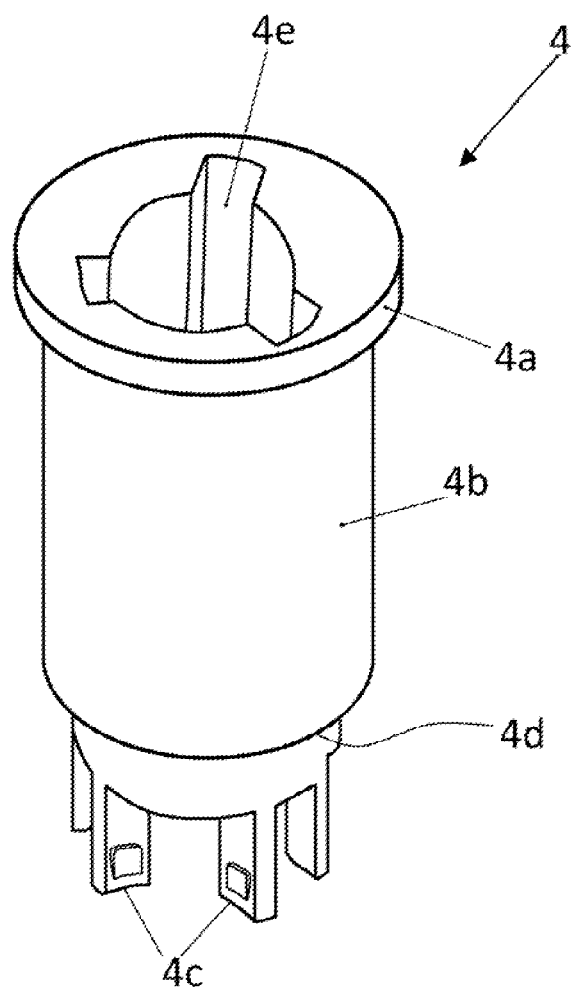
FIG. 3 is a schematic drawing showing an example of a centering element according to the invention from a different perspective.
Figure 4:
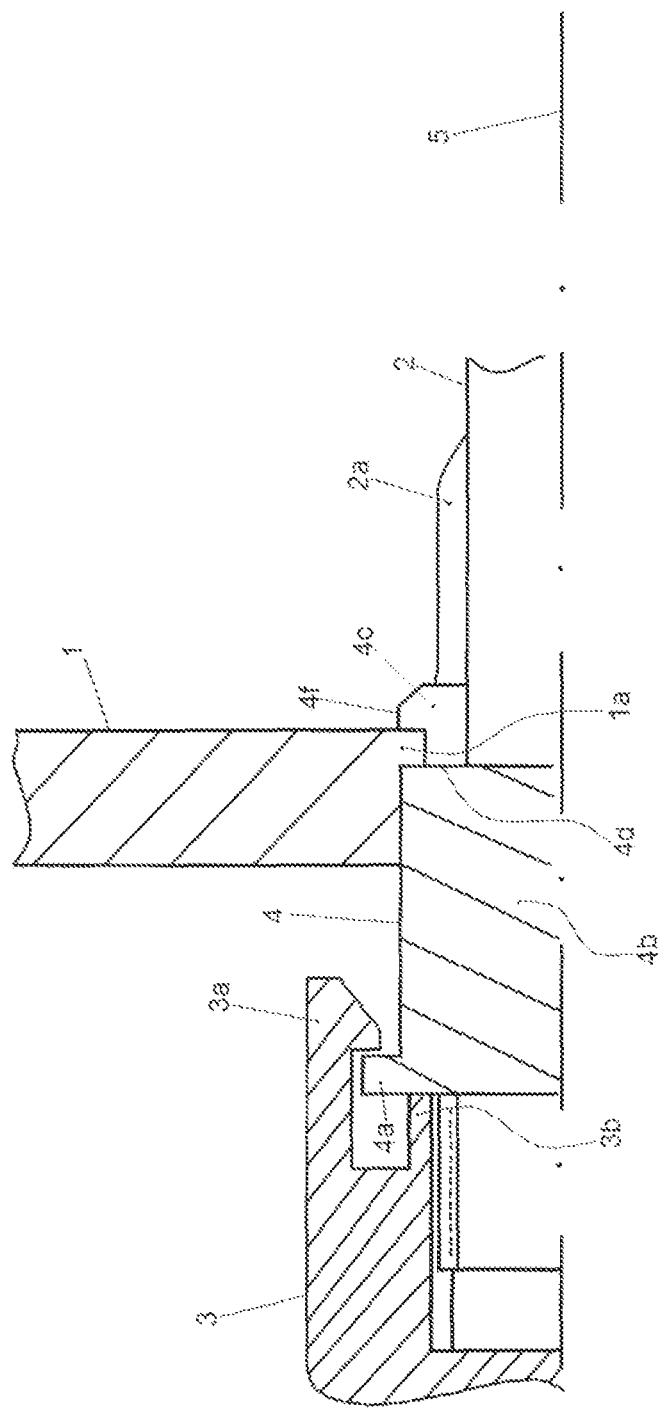
FIG. 4 is a schematic drawing showing a further exemplary presentation of a longitudinal section of the actuator device according to the invention.
Figure 6:
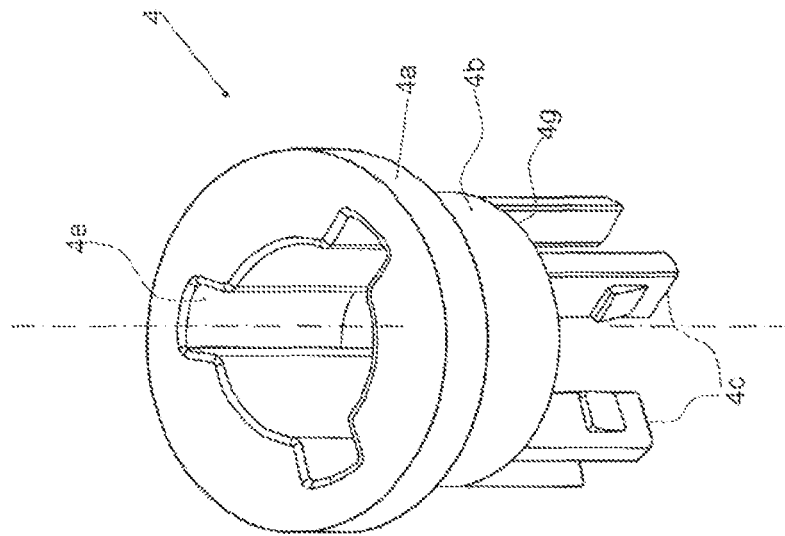
FIG. 6 is a schematic drawing showing a further example of a centering element according to the invention from a different perspective.
Figure 5:
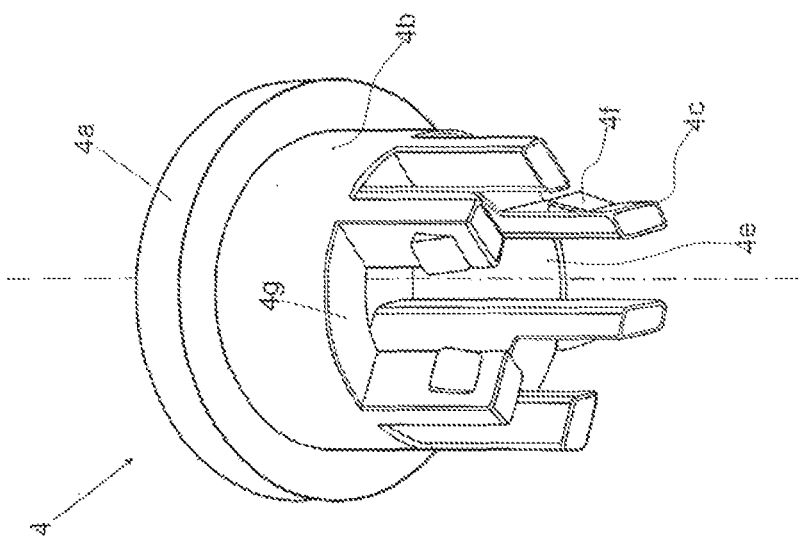
FIG. 5 is a schematic drawing showing a further example of a centering element according to the invention.

The invention features an actuator device 10, FIG. 1, for the seat adjustment in a motor vehicle. The actuator device includes at least one ratchet. fitting 1, a transmission element 2 and an actuator element 3, whereby the transmission element 2 is centered in the ratchet fitting 1 with a centering element 4 such that the centering element 4 allows for a limited torsional backlash between the transmission element 2 and the ratchet fitting 1 and creates a restoring force against the rotation. Typically, the ratchet fitting 1 is designed such that it exhibits a central borehole for receiving an actuator mechanism that is suited for receiving the transmission element 2 with the release of the ratchet fitting 1 occurring through a rotation of the transmission element 2. Typically a driver 1a is provided at the ratchet fitting 1, for example designed in the shape of a cam that interacts with a suitable contour of the transmission element 2. According to the invention, the transmission element 2, which may be a rod, a tube, a shaft or a similar torsionally stiff structure, is in its radial dimensions significantly smaller dimensioned than would be appropriate for conventional direct mounting in the borehole of the ratchet fitting 1 with regard to a secure support. Instead, a centering element 4 is pushed onto the transmission element 2 and inserted into the borehole in the ratchet fitting 1 until it reaches an end position defined by a stop. The stop may be, for example, designed as a shoulder 4d in the contour of the cylindrical section of the centering element 4, however, alternatively areas 4g located between the spring elements 4c may also serve as an axial stop. In its preferred embodiment, the centering element 4 exhibits form-fitting elements 4f that secure the same in the end position of the centering element 4 in the manner of a clip connection in its end position.

In this manner, the exemplary centering element according to the invention fulfills a dual function as a result of its geometry: First, it allows for easy installation of the transmission element 2 in the ratchet fitting 1, as the transmission element 2 can be inserted initially only loosely through the significantly larger borehole into the ratchet fitting 1 because of the dimensioning differences made possible by the centering element 4, in order to then establish the fit between the transmission element 2 and the ratchet fitting 1 by pushing the centering element 4 that establishes the fit and is significantly easier to handle during the installation due to its small size than the transmission element 2 itself.

Second, the centering element 4 has the function to compensate for position tolerances. It fulfills this function first by an axially movable support on the transmission element 2, and second by the form-fit with the contour 2a of the transmission element 2, which is established by spring elements 4c according to the invention. The grooves 4e of the exemplary centering element 4 are designed wider in the direction of the circumference than the elements of the counter contour 2a of the transmission element 2 engaging in the grooves. Thus, the grooves 4e allow for a limited torsional backlash between the centering element 4 and the transmission element 2. The spring elements 4c, on the other hand, rest in the circumferential direction against the counter contour 2a of the transmission element 2. This allows them to transfer a spring force onto the counter contour 2a, which counteracts a rotation that is enabled to a limited extent by the dimensioning of the grooves 4e and the counter contour 2a. The release of the ratchet fitting 1 is done indirectly via the centering element 4, which has a suitable contour and actuates the driver element 1a that is present at the ratchet fitting 1 and in the shown example is a cam. In the example shown, this is advantageously solved such that the spring elements 4c attack both on the counter contour 2a of the transmission element 2 and on the driver element 1a of the ratchet fitting 1.

The actuator element 3 is connected torsionally stiff to the transmission element 2, but pushed in the axial direction only loosely onto the transmission element. The relative positioning of the actuator element 3 in relation to the ratchet fitting 1 and thus to the vehicle seat is done via the centering element 4. For this purpose, the actuator element 3 is connected to the centering element 4 in a form-fitting manner. In the shown example, the form-fit is established by protrusions 3a, which are distributed along the circumference of a circle around the axis 5 of the transmission element 2 at equal distances to this axis 5 and encompass in a hook-like manner form-fitting counter element 4 as designed like a neck collar.

Provided at the actuator element 3 is a stop collar 3b that provides for a defined distance of the actuator element 3 to the ratchet fitting 1 and thus to the vehicle seat. This allows first for positioning of the actuator element 3 in the axial direction defined relative to the ratchet fitting 1 and the motor vehicle seat, while at the same time being insensitive to axial position tolerances of the transmission element 2; through the clip-like form-fitting elements 3a distributed on the circumference, it also allows for rotatable, but axially defined positioning of the actuator element 3 on the motor vehicle seat, which also allows for high tolerances in the radial direction between the transmission element 2 and the actuator element 3, without giving the user the impression of a loose attachment of the actuator element 3 on the motor vehicle seat. In addition, the actuator element 3 can be realized in simple fashion by simply attaching it to the transmission element 2 and the centering element 4, with the resulting connection in the example shown having also the advantage of easy separability for repair or maintenance purposes.

Modifications and substitutions by one of ordinary skill in the art are considered to be within the scope of the present invention, which is not to be limited except by the allowed claims and their legal equivalents.

The invention claimed is:

1. A centering element (4) configured for being disposed in a centrally located borehole in a ratchet fitting (1) and for pushing onto a transmission element (2), for facilitating rotational movement of said transmission element (2) by an actuator element (3), said centering element (4) comprising:
a hollow cylinder shaped base section (4b) having an inner surface, said centering element (4) including a plurality of circumferentially arranged and spaced apart spring elements (4c) which protrude from the base section (4b) and are configured to conform to movement of the transmission element (2) in the axial direction (5), wherein adjacent pairs of spring elements (4c) form a groove (4e) extending in an axial direction between each said adjacent pair of spring elements (4c), said grooves (4e) configured for providing an axially movable form-fitting engagement with one of a plurality of correspondingly shaped counter contours (2a) provided on an outer surface of said transmission element (2), wherein the grooves (4e) have a width in the circumferential direction that is greater than a width of the counter contours (2a) of the transmission element (2) engaging in the grooves, said grooves (4e) configured for allowing for limited torsional movement, in a circumferential direction, of said plurality of counter contours (2a) provided on the outer surface of said transmission element (2) within said grooves (4e) of said hollow cylinder shaped base section (4b) and therefore for allowing for limited torsional movement, in a circumferential direction, of said transmission element, wherein each spring element (4c) abuts against a counter contour (2a), and wherein each spring element (4c) is configured to provide a spring force directed in a circumferential direction against said counter contour (2a) provided on the transmission element (2) abutting each said respective spring element (4c), said base section (4b) further including a stop (4d, 4g) for limiting movement of the centering element (4) into the centrally located borehole in the ratchet fitting (1) in an axial direction, whereby at least one form-fitting counter element (4a) is provided in the axial direction (5) at a second end of the base section (4b), said at least one form-fitting counter element (4a) configured for facilitating coupling of the centering element (4) with said actuator element (3), said actuator element configured for effectuating rotational movement of said transmission element (2).

2. The centering element as set forth in claim 1, characterized in that the at least one form-fitting counter element (4a) is a neck collar.

3. The centering element of claim 1, wherein said centering element (4) is part of an actuator device (10) configured for providing for seat adjustment in a motor vehicle, and wherein said actuator device (10) comprises:
said at least one ratchet fitting (1) including said centrally located borehole;
said transmission element (2); and
said actuator element (3), whereby said centering element (4) is configured for centering the transmission element (2) in the centrally located borehole of the ratchet fitting (1), such that the centering element (4) allows for a limited torsional backlash between the transmission element (2) and the ratchet fitting (1) and creates a restoring force against the rotation, whereby said transmission element (2) is connected to the actuator element (3), whereby the actuator element (3) is connected in a form-fitting manner to the centering element (4).

4. The actuator device with centering element (4) as set forth in claim 3, characterized in that the actuator element (3) is coupled to the transmission element (2) and configured for causing rotational movement of said transmission element (2).

5. The actuator device with centering element (4) as set forth in claim 3, characterized in that the actuator element (3) is connected to the centering element (4) through form-fitting elements (3a) that are configured to engage with said at least one form-fitting counter element (4a) disposed on said second end of said centering element (4).

6. The actuator device with centering element (4) as set forth in claim 5, characterized in that the form-fitting elements (3a) are positioned circumferentially at equal distances to the axis (5) of the transmission element (2).

7. The actuator element with centering element (4) as set forth in claim 3, characterized in that the actuator element (3) includes an axial stop collar (3b).

8. The actuator element with centering element (4) as set forth in claim 3, characterized in that the form-fitting connection of the actuator element (3) is configured to be brought into engagement with the centering element (4) by attaching the actuator element (3) onto the centering element (4).

9. The actuator element with centering element (4) as set forth in claim 3, characterized in that the transmission element (2) is a part of the actuator device for the seat adjustment in a motor vehicle.

* * * * *